United States Patent
Seo et al.

(10) Patent No.: US 8,031,801 B2
(45) Date of Patent: Oct. 4, 2011

(54) METHOD OF CONTROLLING SIGNAL TRANSMISSION IN MULTI-INPUT/MULTI-OUTPUT SYSTEM

(75) Inventors: Dong-Youn Seo, Anyang-shi (KR); Bong-Hoe Kim, Anyang-shi (KR)

(73) Assignee: LG Electronics Inc., Seoul (KR)

( * ) Notice: Subject to any disclaimer, the term of this patent is extended or adjusted under 35 U.S.C. 154(b) by 697 days.

(21) Appl. No.: 12/127,212

(22) Filed: May 27, 2008

(65) Prior Publication Data

US 2008/0260060 A1  Oct. 23, 2008

Related U.S. Application Data

(63) Continuation of application No. 10/946,342, filed on Sep. 22, 2004.

(30) Foreign Application Priority Data

Oct. 1, 2003  (KR) .......................... 10-2003-0068307

(51) Int. Cl.
  *H04L 27/00*  (2006.01)
(52) U.S. Cl. ....................................................... 375/295
(58) Field of Classification Search .................. 375/295, 375/267, 130, 347, 348, 260
  See application file for complete search history.

(56) References Cited

U.S. PATENT DOCUMENTS

| | | | |
|---|---|---|---|
| 6,859,503 B2 | 2/2005 | Pautler et al. | 375/299 |
| 6,985,434 B2 | 1/2006 | Wu et al. | 370/208 |
| 7,184,713 B2 | 2/2007 | Kadous et al. | 455/67.13 |
| 7,248,879 B1 | 7/2007 | Walton et al. | 455/452.2 |
| 2003/0112880 A1 | 6/2003 | Walton et al. | 375/260 |
| 2003/0123559 A1 | 7/2003 | Classon et al. | 375/260 |
| 2004/0027994 A1 | 2/2004 | Baines | 370/252 |
| 2005/0075073 A1* | 4/2005 | Kadous et al. | 455/63.1 |
| 2005/0250544 A1 | 11/2005 | Grant et al. | 455/562.1 |
| 2006/0291582 A1 | 12/2006 | Walton et al. | 375/267 |

FOREIGN PATENT DOCUMENTS

CN  1331869 A  1/2002
(Continued)

OTHER PUBLICATIONS

Office Action dated Mar. 1, 2010 issued in U.S. Appl. No. 10/946,342.

(Continued)

*Primary Examiner* — Khai Tran
(74) *Attorney, Agent, or Firm* — KED & Associates LLP (57) ABSTRACT

A method of controlling signal transmission in a Multiple Input Multiple Output (MIMO) communication system including selecting a modulation and code set (MCS) for each of M data streams transmitted via M transmitting antennas in a transmitting side of the MIMO system, and selectively selecting M−1 or fewer transmitting antennas from the M transmitting antennas for transmitting the data streams based on channel quality information indicative of a transmission performance of the selected MCS corresponding to each of the M transmitting antennas. In another example, the present invention provides a novel method of controlling signal transmission in a MIMO communication system including selecting M weight vectors for streams transmitted by each of M transmitting antennas in a transmitting side of the MIMO system, and selectively selecting M−1 or fewer streams and weight vectors from the M weight vectors for transmitting data streams based on channel quality information indicative of transmission performance of the selected weight vectors corresponding to each of the M vector spaces.

7 Claims, 5 Drawing Sheets

PARC method

FOREIGN PATENT DOCUMENTS

| | | |
|---|---|---|
| JP | 2002-232234 | 8/2002 |
| KR | 10-2003-0069299 A | 8/2003 |
| WO | WO01/29986 | 4/2001 |

OTHER PUBLICATIONS

Korean Office Action dated Feb. 26, 2010 for Application No. 10-2003-0068307.

Chinese Office Action dated Mar. 6, 2009.

Hwang, Intae, et al.; "Performance of Adaptive Modulation and Coding with Selection Transmit Diversity in MIMO Multiplexing Systems"; vol. 27 No. 10B; pp. 9-1 to 9-9; (02-27-10B-4) (English Abstract and Korean Full Text).

Ahn, Cheol Yong, et al., "Downlink Performance of Transmit Adaptive Array with Antenna Selection Diversity"; vol. 27, No. 12B; pp. 8-1 to 8-8; (02-2742B-6) (English Abstract and Korean Full Text).

Korean Office Action dated Jan. 30, 2009.

Alessio Milani, Velio Tralli and Michele Zorzi, "On the use of per-antenna rate and power adaptation in V-BLAST systems for protocol performance improvement", pp. 2126-2130, 2002 IEEE.

Andrej Stefanov and Elza Erkip, "Cooperative Space-Time Coding for Wireless Networks", ITW2003, Paris, France, Mar. 31-Apr. 4, 2003.

3GPP TSG RAN WG1: "Increasing MIMO throughout with per-antenna rate control"; Aug. 31, 2001 (XP-002988962).

International Search Report Dated Apr. 4, 2005.

European Search Report dated Dec. 21, 2006.

Huang, H. et al.; "Increasing the Peak Data Rate of 3G Downlink Packet Data Systems Using Multiple Antennas"; IEEE Semiannual Vehicular Technology Conference Spring 2003; vol. 1; Apr. 22-25, 2003; pp. 311-315.

European Search Report dated May 15, 2008.

U.S. Final Office Action dated Aug. 16, 2010 issued in U.S. Appl. No. 10/946,342.

Korean Office Action dated Sep. 4, 2008.

Chinese Office Action dated Nov. 13, 2009.

* cited by examiner

PARC method
FIG. 1

FIG. 2

FIG. 3
PSRC method

METHOD OF CONTROLLING SIGNAL TRANSMISSION IN MULTI-INPUT/MULTI-OUTPUT SYSTEM

CROSS-REFERENCE TO RELATED APPLICATIONS

This application is a Continuation Application of prior U.S. patent application Ser. No. 10/946,342 filed Sep. 22, 2004, which claims priority under 35 U.S.C. §119 to Korean Application No. 2003/0068307 filed on Oct. 1, 2003, which is hereby incorporated by reference in its entirety. The present invention is also related to U.S. application Ser. No. 10/845,086, filed on May 14, 2004; Ser. No. 10/834,210, filed on Apr. 29, 2004; Ser. No. 10/939,965, filed on Sep. 14, 2004; and Ser. No. 10/948,686, filed on Sep. 24, 2005, all of which are hereby incorporated in their entirety.

BACKGROUND OF THE INVENTION

1. Field of the Invention

The present invention relates to a method of signal processing applied to a Multi-Input/Multi-Output (MIMO) system, and more particularly to a signal processing method by which a data stream is transmitted selectively using only some of a plurality of available transmitting antennas or weight vectors based on channel quality information for each transmitting antenna.

2. Background of the Related Art

A V-BLAST (Vertical Bell Laboratories Layered Space Time) system is one example of a MIMO system, which includes M transmitting antennas and N receiving antenna (where N≧M). See, for example, P. W. Wolniansky, G. J. Foschini, G. D. Golden and R. A. Valenzuela, 'V-BLAST: An Architecture for Realizing Very High Data Rates over the Rich-scattering Wireless Channel', IEE Electronics Letters, Vol. 35, No. 1, pp. 14-16, January, 1999, which is hereby incorporated in its entirety.

In more detail, by transmitting different signals in parallel over different antennas, in an environment characterized by rich scattering and multipath, this technique can provide high data rates thanks to an efficient algorithm on the receiving end which includes interference nulling from yet undetected signals and interference cancellation from already detected signals. In this manner, the receiver is able to produce independent virtual subchannels, one for each transmitting antenna, leading to a channel capacity which grows approximately linearly with the number of antennas. However, an increase in the number of transmitting antennas also increases the amount of channel quality information fed back to the transmitting end from the receiving end. The overhead requirements for processing the channel quality information and the interference caused by excessive channel quality information negatively effects the overall system performance.

SUMMARY OF THE INVENTION

Accordingly, one object of the present invention is to at least address the above-noted and other problems.

Another object of the present invention is to reduce the amount of required control signals required for communication with a MIMO system.

To achieve these objects and other advantages and in accordance with the purpose of the invention, as embodied and broadly described herein, the present invention provides a novel method of controlling signal transmission in a Multiple Input Multiple Output (MIMO) communication system including selecting a modulation and code set (MCS) for each of M data streams transmitted via M transmitting antennas in a transmitting side of the MIMO system, and selectively selecting M−1 or fewer transmitting antennas from the M transmitting antennas for transmitting the data streams based on channel quality information indicative of a transmission performance of the selected MCS corresponding to each of the M transmitting antennas. In another example, the present invention provides a novel method of controlling signal transmission in a MIMO communication system including selecting M weight vectors for data streams transmitted by M transmitting antennas in a transmitting side of the MIMO system, and selectively selecting M−1 or fewer streams and weight vectors from the M weight vectors for transmitting data streams based on channel quality information indicative of transmission performance of the selected weight vectors corresponding to M transmitting vector spaces.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The invention will be described in detail with reference to the following drawings in which like reference numerals refer to like elements wherein.

BEST MODE OF THE INVENTION

Referring now to the drawings, wherein like reference numerals designate identical or corresponding parts throughout the several views, the present invention will now be described.

The MIMO communication system includes M transmitting antennas in a transmitting side and N receiving antennas in a receiving side, where N≧M. Two type of transmission methods in the MIMO communication system include the PARC method and the PRSC method. The PARC method transmits a data stream in a 1:1 correspondence with the number of transmitting antennas. The PSRC method applies different weight vectors to a particular data stream and transmits that data stream from each antenna. The receiving end then feeds back channel quality information to the transmitting end.

The channel quality information includes, for example, a Signal to Interference Noise Ratio (SINR) for each transmission channel/antenna in the PARC method and eigen vectors in the PSRC method. For example, the transmitting end receives channel quality information indicating how good (or bad) the channel quality is for that respective antenna. A QAM modulation method may be used when "good" channel quality information has been received and a QPSK modulation method may be used when "bad" channel quality is received. Whether the channel quality is "good" or "bad," for example, may be determined using a predetermined threshold (e.g., if the SINR is above or equal to threshold, the channel quality information may be determined to be "good").

In the PARC method, the present invention advantageously selectively selects (via a control unit 18 shown in FIG. 1) M−1 or fewer transmitting antennas from the M transmitting antennas to be used for transmitting data streams based on the channel quality information corresponding to each of the M transmitting antennas, which is received from the receiving end. For the PARC method, the channel quality information is derived from the MCS selected for that particular antenna. For example, assume a first antenna transmits with a MCS of 16 QAM and ¾ code rate, and a second antenna transmits with a MCS of QPSK modulation and ½ code rate. In this simplified example, the transmitting end receives channel quality information indicating the quality of transmission for the first and second transmitting antennas. Thus, if the SINR for the first antenna is better than the second antenna (and the channel quality (SINR) for the second antenna is below a predetermined threshold), the present invention selectively uses only the first antenna to transmit data. This reduces the amount of channel quality information that is transmitted back to the transmitting end, and avoids transmitting with the second antenna that is not transmitting quality data (e.g., the SINR does not satisfy a predetermined threshold).

For the PSRC method, the channel quality information is derived from a particular weight vector (eigen vector) applied to the data stream. For example, assume there are 3 transmitting antennas. In this example, the first streams is multiplied by weight vector W1 with size of 3 by 1. This results in $s_1w_{11}$, $s_1w_{12}$, and $s_1w_{13}$, which are then respectively transmitted by the 3 transmitting antennas (e.g., antenna #1 transmits $s_1w_{11}$, antenna #2 transmits $s_1w_{12}$ and antenna #3 transmits $s_1w_{13}$), where $s_1$ means the first stream and $w_{11}$, $w_{12}$, and $w_{13}$ mean elements of vector, W1. Like this if there are the second and third streams $s_2$ and $s_3$, $s_2$ and $s_3$ are multiplied by weight vector W2 and W3, respectively. W1, W2 and W3 should be orthogonal vectors (i.e. eigen vectors). In this example, if the channel quality information for stream #1 and #2 was "good" and the information for stream #3 was "bad", the present invention advantageously selects only the weight vectors W1, and W2 to transmit data (via the control unit 18 shown in FIG. 3). Thus, a limited number of weight vectors among all available weight vectors is advantageously selectively selected according to the present invention. In both methods, according to the present invention, the amount of feedback channel quality information and required processing is advantageously reduced.

Figure 1:
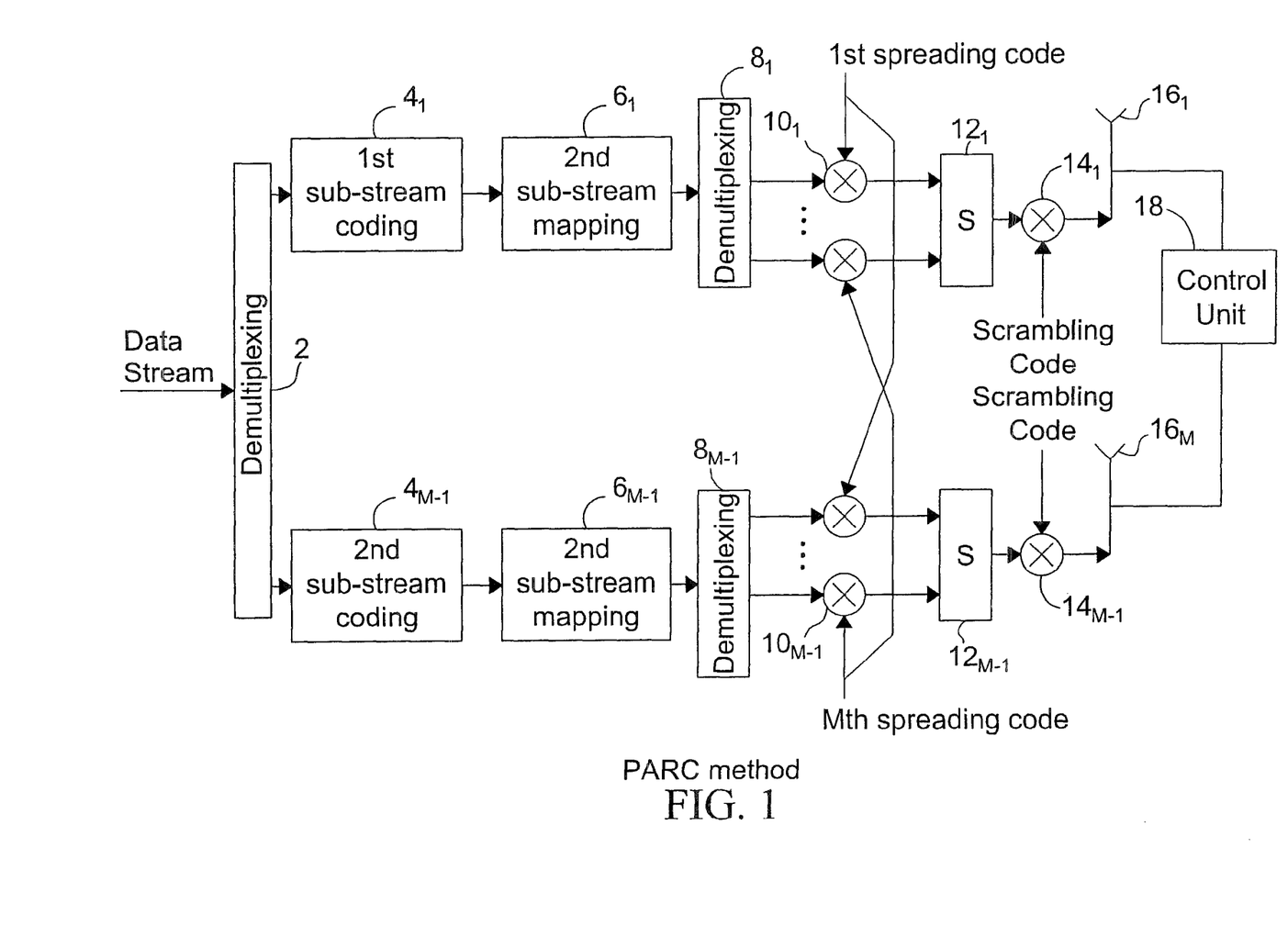
FIG. 1 is a block diagram of a transmitting side of a MIMO communication system using a Per Antenna Rate Control (PARC) method.

Turning now to FIG. 1, which is a block diagram of a transmitting side of a MIMO system using the PARC method. In this example, a demultiplexer 2 demultiplexes a data stream prior to the data stream being transmitted via a plurality of transmitting antennas $16_1$ to $16_M$. Firstly, the controller decide how many antennas will be selected among the M transmit antennas according to the channel quality information from receiver. Then, the demultiplexing unit demultiplexes the input data stream into the substreams, the number of which is the number of selected antennas. The number of bits allocated to each of the antennas may be different based on a data rate of transmission via each antenna. That is, the MCS may be individually set for each antenna.

After having been demultiplexed, the data stream forms sub-streams corresponding to the respective selected antenna in a 1:1 correspondence. In this example, we assume that M−1 antennas are selected. Then, the sub-streams undergo coding and interleaving to be mapped to symbols, via the coding units $4_1$ to $4_{M-1}$ and the mapping units $6_1$ to $6_{M-1}$, respectively. The symbols are then demultiplexed via the demultiplexer 8 prior to being spread by spreading codes in the spreading unit $10_1$ to $10_{M-1}$, respectively. The demultiplexed spread signals are then combined in symbol combining units $12_1$ to $12_{M-1}$, scrambled with the scrambling units $14_1$ to $14_{M-1}$, and transmitted via the antennas $16_1$ to $16_M$. Further, the coding is performed only in a time dimension and thus is not as powerful as space-time coding used in single-rate system. However, coding in the time domain cancels post-decoding interference, thereby enhancing the performance of a receiver. In addition, because the data is demultiplexed, signals transmitted via the respective transmitting antennas can be independently decoded.

An example of an operation of the transmitting side will now be given. Assume, for example, that a data stream input to the demultipexer 2 includes 9600 bits. The demultiplexer 2 then segments the input data stream into two data blocks including 4800 bits each, for example (assuming that two antennas are selected among three transmitting antennas). The two 4800 data bits are then processed by the coding, interleaving and mapping unit $4_1$ to $4_{M-1}$ and $6_1$ to $6_{M-1}$. In more detail, each of the 4800 bits is coded based on the coding scheme for that particular antenna (assume a turbo coding of ½ is used for the first substream and a turbo coding of ⅓ is used for the (M−1)-th substream to transmit via M−1 selected antennas among $16_1$~$16_M$). Thus, is in this example, the first 4800 bits would be coded into 9600 bits (i.e., a turbo coding of ½) and the (M−1)-th 4800 bits would be coded into 14400 bits (i.e., a turbo coding of ⅓). The two coded blocks of data are then stored into an interleaver for mapping. Assume Quadrature Amplitude Modulation (QAM) is used for the first substream and Quadrature Phase Shift Keying (QPSK) is used for the (M−1)-th substream $4_{M-1}$. Then, the first 9600 coded bits will be mapped into 2400 symbols (i.e., QAM maps 4 bits to one symbol and thus 9600 coded bits will be mapped into 2400 symbols). The (M−1)-th 14400 bits will be mapped into 7200 symbols (i.e., QPSK maps 2 bits into one symbol and thus 14400 coded bits will be mapped into 7200 symbols). The two separate coded and modulated data blocks are then demultiplexed by the demultiplexing units $8_1$ to $8_{M-1}$ and processed by the spreading unit $10_1$ to $10_{M-1}$.

The spreading unit $10_1$ to $10_{M-1}$ uses a variety of spreading codes such as OVSF (Orthogonal Variable Spreading Factor) codes to spread the data blocks so as to discriminate between different channels of each antenna. Note the receiving side shown in FIG. 2 of the MIMO system has the same spreading codes and despreads the received data using the same codes. Thus, the MIMO system is able to select a different MCS for each respective antenna to thereby increase the throughput of the system.

The spread symbols are then combined in the symbol combining unit $12_1$ to $12_{M-1}$ scrambled in the scrambling unit $14_1$ to $14_{M-1}$ prior to being transmitted from the respective M−1 selected antennas among $16_1$~$16_M$. Note the scrambling codes are used to discriminate cell regions (e.g., the received information is being received from Node B 1 rather than Node B 2, for example).

The receiving operation reverses the transmitting operation to finally obtain the initially transmitted data. In more detail, the receiving operation reverses the transmitting operation to finally obtain the initially transmitted data. In more detail, with reference to FIG. 2, the receiving side includes receiving antennas 20, interference removing unit 22, a Minimum Mean Square Error (MMSE) detector, despreaders 26, a multiplexer 28, a signal detection, de-mapping, de-interleaving and de-coding unit 30, a signal reconfiguration unit 32 and combining and multiplexing unit 34.

Figure 2:
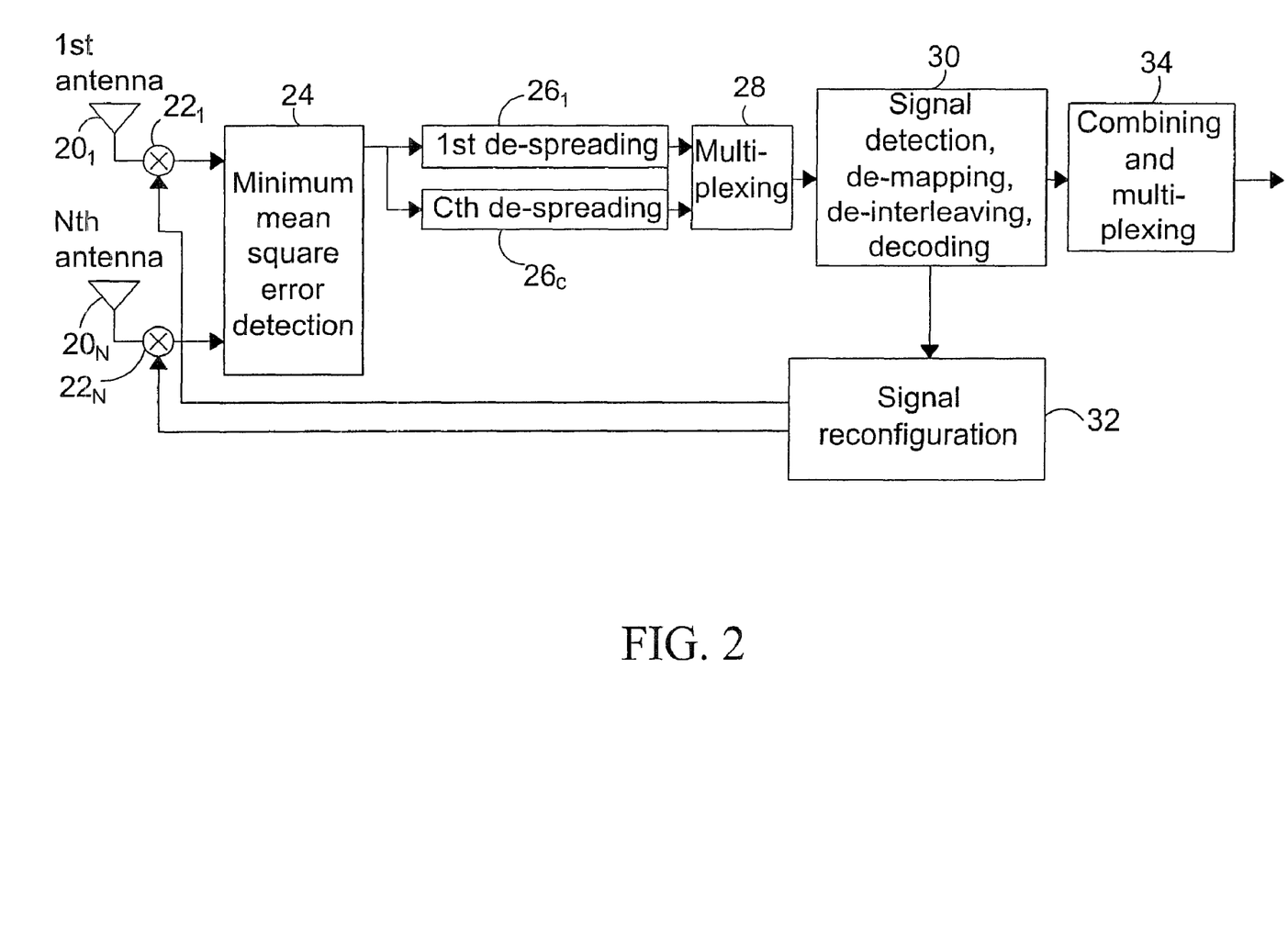
FIG. 2 is a block diagram of a receiving side of the MIMO communication system using the PARC method.

Further, the MMSE detector 24 of the receiving end detects a signal having the greatest SINR (Signal-to-Interference Noise Ratio) among signals received through the plurality of reception antennas ($20_1 \sim 20_N$) and performs an MMSE equalization on the signal. Outputs of the MMSE detector 24 are despread in the despreaders 26 and then combined to one signal. The signal detection unit 30 detects a transmission symbol from a signal outputted from the multiplexer 28 and performs de-mapping and de-interleaving operations on the detected symbol to detect a first sub-stream.

At this time, the signal reconfiguration unit 32 reconstructs the first sub-stream detected by the signal detecting unit 30 into a receiving signal form and outputs it to the interference removing unit 22. To minimize influence between symbols, the interference removing unit 22 deletes a first detected signal component (reconstructed signal) from the receiving signal previously stored in the buffer and then the signal component-detected signal to the MMSE detector 24.

Then, the MMSE detector 24 equalizes the signal having the greatest SINR among the reconstructed signal-removed signals. An output of the MMSE detector 24 is inputted to the signal detection unit 30 through the despreaders 26 and the multiplexer 28, and the signal detection unit 30 detects a second sub-stream.

The signal reconfiguration unit 32 reconstructs the second sub-stream which has been detected by the signal detection unit 30 and outputs it to the interference removing unit 22. Then, the interference removing unit 22 deletes the reconstructed signal from a signal previously stored in the buffer and outputs it to the MMSE detector 24.

Thereafter, by repeatedly performing the above-described operations, the signal detection unit 30 sequentially detects sub-streams. After all the sub-streams are detected by the signal detection unit 30, the combining unit 34 assembles the plurality of detected sub-streams to form one data stream.

Thus, in summary, the V-BLAST system performs communications using M-transmitting antennas and N-receiving antennas. In doing so, the sequentially generated data essentially passes through a serial-parallel converting circuit to be transmitted as separate signals in parallel via the respective antennas. In addition, as noted above, the modulation and coding scheme (MCS) of the signal transmitted can be individually set for each antenna.

Further, individually selecting the MCS increases the throughput of the MIMO system. However, the receiving side must send signaling channel information to the transmitting side (such as Channel Quality Indicators (CQIs) indicating a quality of a channel). For example, if the MCS of four antennas are individually controlled, there is four times as much channel status information (such as CQIs) as compared to a single antenna using a single code. Thus, an extra signaling load is added to the MIMO system.

Figure 3:
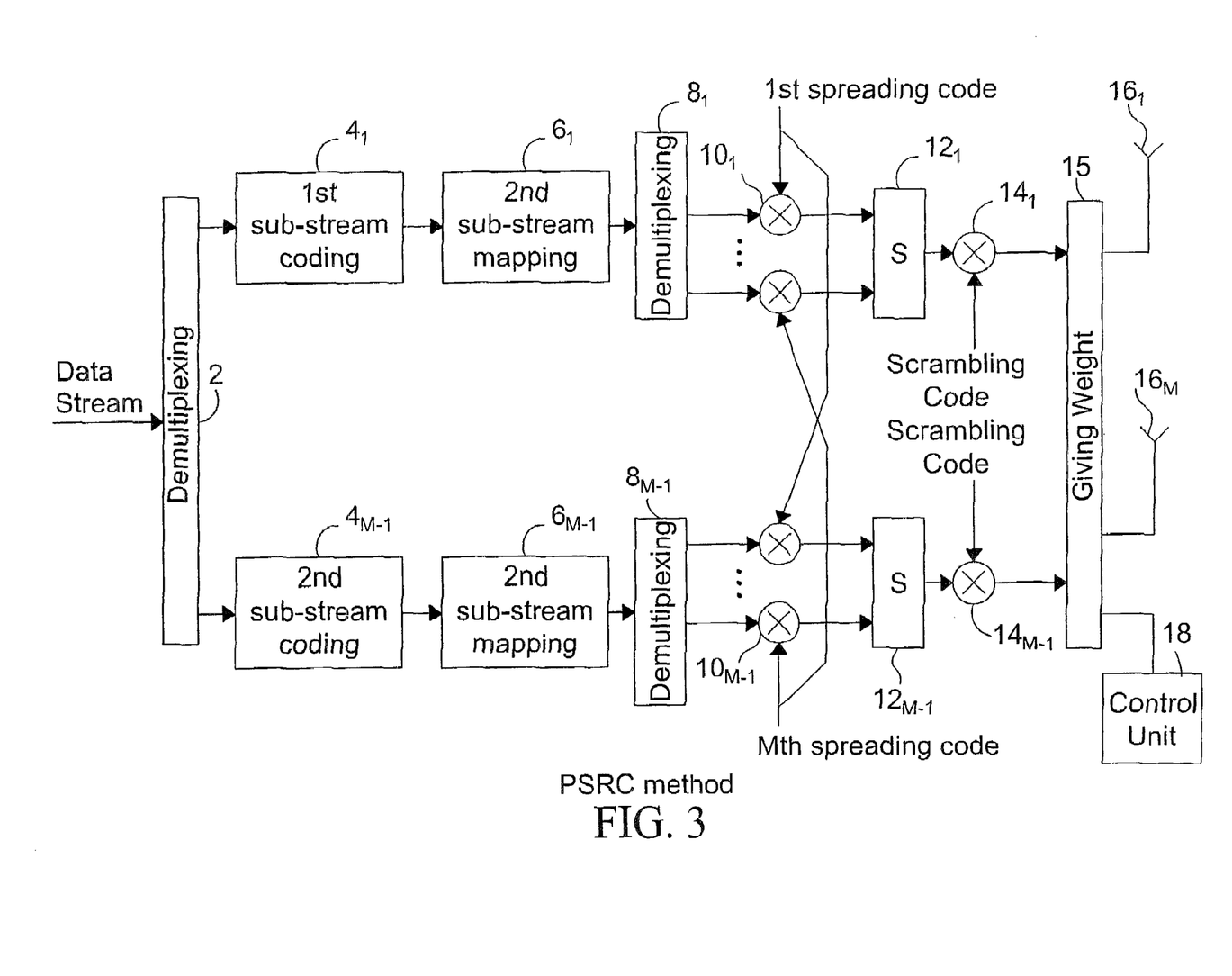
FIG. 3 is a block diagram of a transmitting side of the MIMO system using a (Per Stream Rate Control) PSRC method.

Next, FIG. 3 is a block diagram of a transmitting side of an MIMO system using the PSRC method. Note FIG. 3 is similar to the transmitting side shown in FIG. 1, but includes a weight unit 15 for multiplying a data stream. Components in the previous figures which have been explained will not be repeated for brevity purposes. Further, whereas each stream is mapped to each antenna in one-to-one correspondence in the PARC method, each stream is multiplied by an orthogonal weight vector having a size of a transmitting antenna number and the weighted streams are distributed to the transmitting antennas, respectively in the PSRC method. That is, for a transmitting end having four antennas the weight vector (eigen vector) will have four weight values. The same data stream is multiplied by the four different weight values and respectively transmitted by the four antennas. One stream of data is transmitted by the same method as Tx diversity which is an overlapping method for transmitting various streams with the same transmitting antenna combination.

Figure 4:
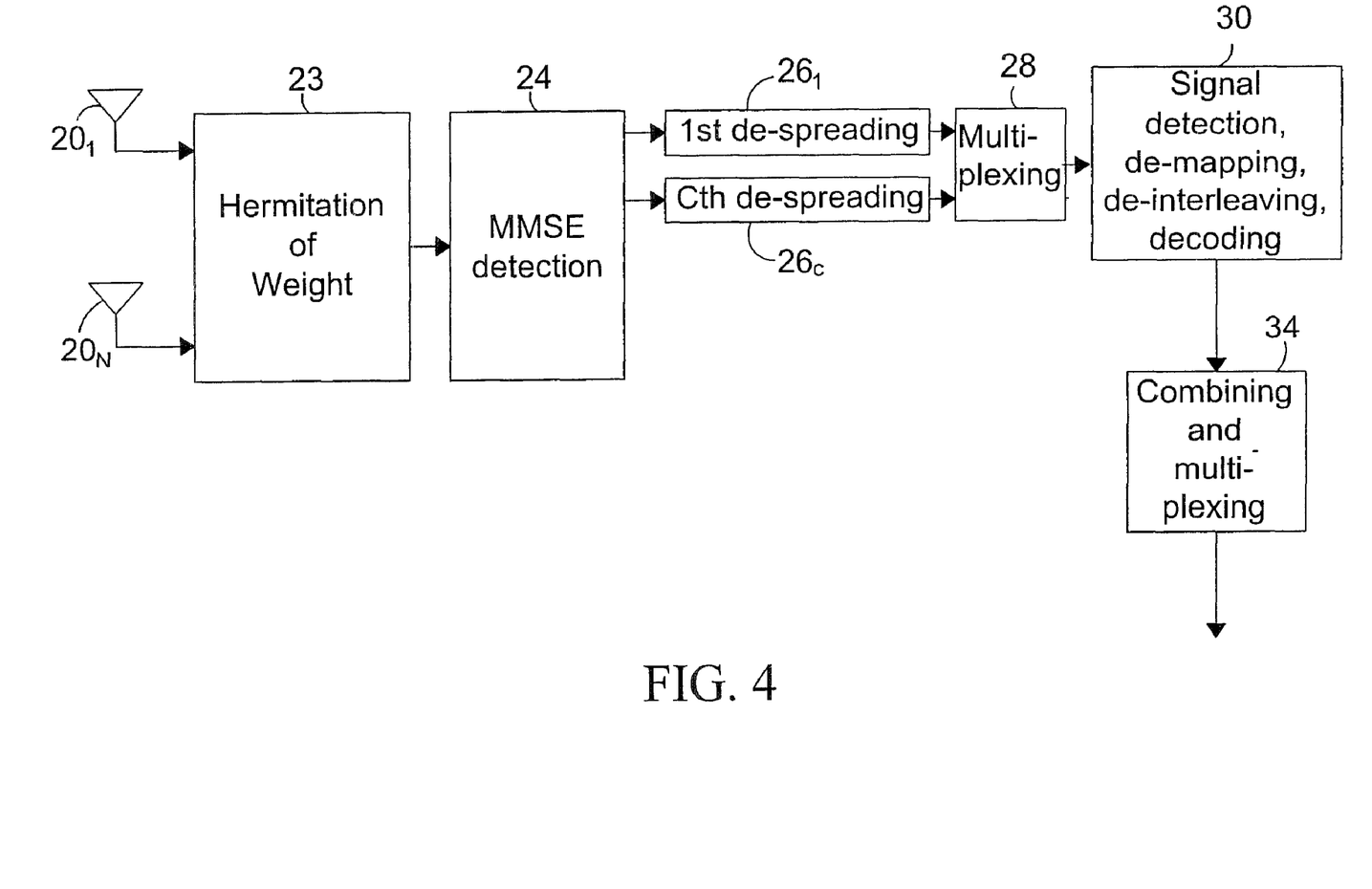
FIG. 4 is a block diagram of a receiving side of the MIMO system using the PSRC method.

Next, FIG. 4 is a block diagram of a receiving side of a MIMO system using the PSRC method. In this example, because the transmitting end in FIG. 3 multiplied each stream by an orthogonal weight vector and transmitted the weighted data via a corresponding antenna, the receiving side of the MIMO can receive each stream without interference by multiplying a Hermitian of the weight vector using a weight unit 23. Hence, the PSRC method on the receiving end does not need an interference countering process.

In the above-noted examples, the data streams are transmitted according to the number of the transmitting antennas. That is, each antenna is used to transmit data, which requires a control signal to be transmitted from the receiving end to the transmitting end for each data stream. The control signals include, for example, channel quality indicators (CQI) per stream for selection of a Modulation and Code Set (MCS), HARQ-ACK/NACK, etc.

Further in the PSRC method, the transmission of a weight vector per stream is also required. Transmission control signals are also required to transmit control signals such as modulation information according to each stream, transport block size, HARQ processing information, etc to the receiving side from the transmitting side. Thus, an increase in the number of streams also increases the number of control signals. Further, the receiving side requires a number of receiving antennas that is greater then or equal to than the number of transport streams (i.e., M≧N).

An example of a distribution of eigen values in a system having (4,4)-transmitting/receiving antennas using the PSRC method will now be explained. First, about two eigen values have sizes valid for data transmission, whereas the MSC of an almost minimum data rate is selected for the other two eigen values or failure of data transmission occasionally happens.

A signal processing method in a receiving side of the MIMO is summarized as follows. In this explanation it is assumed the MIMO system includes M-transmitting antennas and N-receiving antennas. Further, if a signal vector transmitted via each of the M-transmitting antennas is represented by a and a channel matrix through which a transmission signal vector passes before being received in a receiving side is represented by H, a signal vector $r_1$ can be defined by the following equation:

$$r_1 = Ha + v \qquad \text{(Equation 1)}$$

Further, signals transmitted from the M-transmitting antennas are received by the N-receiving antennas via separate paths. Thus, the channel matrix H can be defined as a N*M matrix. Namely, the signals ($a_1, a_2, \ldots, a_M$, i.e., M*1 vector) differently transmitted via the M-antennas pass through separate channels $h_{i,j}$, respectively and are received in the receiving side via the N-antennas. Further, in equation 1, v indicates Gaussian noise and is induced to the respective receiving antennas to become an (N+1) vector.

In addition, the signals received via the N-antennas pass through a receiving side signal processing unit having the following signal search algorithm. First, a signal vector resulting from detecting the transmission signal vector a, ($a_1, a_2, \ldots, a_M$) in the receiving side is expressed by ($k_1$, $k_2, \ldots, k_M$). Thus, for the receiving side to detect the signals transmitted from the separate antennas of the transmitting side, the N-antennas are multiplied by a weight vector that is denoted by w. In this instance, as the separate signals are transmitted from the antennas of the transmitting side, respectively, the receiving side requires M-weight vectors to detect the signals. The weight vector to be multiplied to each of the antennas of the receiving side is defined as follows:

$$w_i^H H_j = 0 \quad (j \geq i)$$

$$w_i^H H_j = 0 \quad (j = i) \quad \text{(Equation 2)}$$

In equation 2, $H_j$ indicates the $j^{th}$ column vector of H. Namely, the weight vector $w_i^H$, which will be multiplied by the antenna of the receiving side to detect the $i^{th}$ transmission data, is '1' only for the multiplication by the $j^{th}$ column vector of H. Otherwise, the weight vector $w_i^H$ is '0' for the rest of the column vectors. That is, the weight vector $w_i^H$ for receiving the data transmitted from an $i^{th}$ transmitting antenna is calculated to remove the influence of the signals transmitted from the other transmitting antennas. Because the transmitted signals are sequentially detected, the influence of the previously detected signal is excluded before the weight vector to be used for current detection is found.

The weight vector meeting the attribute of equation 2 can be found by using the following equation. Note that the signal vector received by the receiving side in equation 1 can also be expressed by the below equation.

$$r_1 = a_1 H_1 + a_2 H_2 + \ldots + a_M H_M \quad \text{(Equation 3)}$$

In addition, the signals transmitted from the transmitting antennas pass through separate channels to be received in the receiving side, respectively, which is expressed by equation (3) in a linear sum total form. As can be seen in equation (3), in detecting a first transmission signal, it is preferable that reception is performed by multiplying a receiving antenna by the weight vector that allows the corresponding reception after the influence of a second to $M^{th}$ signals is removed. To meet such a requirement, the weight vector can be updated in the following manner.

First, once the weight vector update process begins, a Moore-Penrose pseudo-inverse matrix of a first H matrix is found to be denoted by $H^+$ or $G_1$. Hence, the following equation is established:

$$G_1 = H^+ \quad \text{(Equation 4)}$$

Meanwhile, a row vector having a smallest vector norm is searched from the respective row vectors of the matrix $G_1$. If the row vector having the smallest value among vector norms of the row vectors is denoted by K, the weight vector $w_i$ for detecting a $K^{th}$ transmission signal is selected as a $K^{th}$ row of the matrix $G_1$. In addition, a reception vector $r_1$ is then multiplied by the weight vector $w_i$ to detect the signal transmitted from a $K^{th}$ antenna. In this instance, as the transmitting side knows the modulation scheme (e.g., digital modulation such as QPSK, QAM, etc.), a signal $â_k$ finally transmitted from the $K^{th}$ transmission antenna is detected by deciding which constellation the signal belongs to. Thus, once the signal transmitted from the $K^{th}$ antenna is detected, the influence of the $K^{th}$ signal is added or deducted in equation (3). Namely, an operation defined in the following equation 5 is executed.

$$r_2 = r_1 - â_k H_k \quad \text{(Equation 5)}$$

In equation (5), $r_2$ indicates a reception vector to be used in a second update. Further, the matrix G to be used in finding $G_2$, i.e., the second weight vector, is the Moore-Penrose pseudo-inverse matrix of a matrix having $K^{th}$ column of $H^+$ entirely set to '0', which is represented by the following equation:

$$G_2 = H_{\bar{k}}^+ \quad \text{(Equation 6)}$$

In equation (6), $H_{\bar{k}}^+$ is the Moore-Penrose pseudo-inverse matrix of a matrix having $K^{th}$ column of the matrix $H^+$ set to '0'.

Then, a row vector having a smallest vector norm is searched from the respective row vectors of matrix $G_2$. If the row vector having the smallest value among vector norms of the row vectors is denoted by V, the weight vector w, for detecting a $V^{th}$ transmission signal is selected as a $V^{th}$ row of the matrix $G_2$. A reception vector $r_2$ is then multiplied by the weight vector $w_v$ to detect the signal transmitted from the $V^{th}$ antenna. Again, because the transmitting side knows the modulation scheme used (e.g., digital modulation such as QPSK, QAM, etc.), a signal $â_k$ finally transmitted from the $V^{th}$ transmission antenna can be detected by deciding which constellation the signal belongs to. Thus, once the signal transmitted from the $V^{th}$ antenna is detected, the $V^{th}$ signal is added or deducted in equation (5). Namely, the operation defined in the following equation is executed.

$$r_3 = r_2 - â_k H_v \quad \text{(Equation 7)}$$

In equation (7), $r_3$ indicates a reception vector to be used in a third update. The above-explained procedures are repeated until all of the respective signals transmitted from the M-antennas are found.

Unlike the method of applying the same channel coding and modulation schemes to the symbols transmitted from the respective antennas, the PARC method transmits symbols from the respective antennas by reflecting channel statuses of the respective antennas differently on the channel coding and modulation of the symbols.

That is, in the PARC method, independently encoded signal are transmitted from each antenna. Namely, the PARC differs from the single rate MIMO V-BLAST technology in that the data rate (modulation and coding set) can be varied in each antenna. Thus, the PARC method allows independent control of a data rate of each antenna, whereby the throughput of the overall system is enhanced.

In this instance, even if the number of bits needed to inform a channel status per antenna is greater than that of the technologies proposed for the single rate MIMO system, a reference set can be decided. Namely, in the PARC method, to decide a Modulation and Coding Set (MCS) that is valid for each antenna, a received Signal to Interference Noise Ratio (SINR) from each transmitting antenna is calculated in the receiving antenna. That is, to select the proper MCS used in each antenna, the SINR received in each receiving antenna is measured. Then, the MSC to be used in each antenna is selected based on the measured SINR.

Table 1 illustrates a data rate and MSC corresponding to the (4,4) system.

TABLE 1

| bps/Hz | Data rate (Mbps) | Modulation | Code rate |
|---|---|---|---|
| 3 | 7.2 | 16QAM | 3/4 |
| 2 | 4.8 | 16QAM | 1/2 |
| 1.5 | 3.6 | QPSK | 3/4 |
| 1 | 2.4 | QPSK | 1/2 |
| 0.5 | 1.2 | QPSK | 3/4 |

For the PARC method applied to a (4,4) antenna system, a code reuse order is selected as '4' in highest geometries (index 1 to index 38) and another code reuse order of '2' is simultaneously used for selection in the index 39 to index 54. Further, for the lowest geometries, selective diversity and a single antenna transmission are used.

Table 2 illustrates a data rate set in a system using a transmitting antenna and four receiving antennas.

TABLE 2

| Index | Data rate: Mbps | 1$^{st}$ Ant. | 2$^{nd}$ Ant. | 3$^{rd}$ Ant. | 4$^{th}$ Ant. |
|---|---|---|---|---|---|
| 1 | 28.8 | 3 | 3 | 3 | 3 |
| 2 | 26.4 | 3 | 3 | 2 | 3 |
| 3 | 26.4 | 3 | 2 | 3 | 3 |
| 4 | 6.4 | 2 | 3 | 3 | 3 |
| 5 | 24.0 | 2 | 3 | 3 | 2 |
| 6 | 24.0 | 2 | 3 | 2 | 3 |
| 7 | 24.0 | 2 | 2 | 3 | 3 |
| 8 | 21.6 | 2 | 2 | 3 | 2 |
| 9 | 21.6 | 2 | 2 | 2 | 3 |
| 10 | 19.2 | 2 | 2 | 2 | 2 |
| 11 | 22.8 | 2 | 1.5 | 3 | 3 |
| 12 | 20.4 | 2 | 1.5 | 2 | 3 |
| 13 | 18.0 | 2 | 1.5 | 2 | 2 |
| 14 | 19.2 | 2 | 1.5 | 1.5 | 2 |
| 15 | 16.8 | 2 | 1 | 2 | 2 |
| 16 | 25.2 | 1.5 | 3 | 3 | 3 |
| 17 | 22.8 | 1.5 | 3 | 2 | 3 |
| 18 | 22.8 | 1.5 | 2 | 3 | 3 |
| 19 | 20.4 | 1.5 | 2 | 2 | 3 |
| 20 | 18.0 | 1.5 | 2 | 2 | 2 |
| 21 | 19.2 | 1.5 | 2 | 1.5 | 2 |
| 22 | 21.6 | 1.5 | 1.5 | 3 | 3 |
| 23 | 21.6 | 1.5 | 1.5 | 3 | 3 |
| 24 | 16.8 | 1.5 | 1.5 | 2 | 2 |
| 25 | 14.4 | 1.5 | 1.5 | 2 | 1 |
| 26 | 15.6 | 1.5 | 1.5 | 1.5 | 2 |
| 27 | 15.6 | 1.5 | 1 | 2 | 2 |
| 28 | 24.0 | 1 | 3 | 3 | 3 |
| 29 | 21.6 | 1 | 3 | 2 | 3 |
| 30 | 21.6 | 1 | 2 | 3 | 3 |
| 31 | 19.2 | 1 | 2 | 2 | 3 |
| 32 | 16.8 | 1 | 2 | 2 | 2 |
| 33 | 15.6 | 1 | 2 | 2 | 1.5 |
| 34 | 15.6 | 1 | 2 | 1.5 | 2 |
| 35 | 18.0 | 1 | 1.5 | 2 | 3 |
| 36 | 15.6 | 1 | 1.5 | 2 | 2 |
| 37 | 20.4 | 0.5 | 2 | 3 | 3 |
| 38 | 15.6 | 0.5 | 2 | 2 | 2 |
| 39 | 14.4 | 3 |  | 3 |  |
| 40 | 14.4 |  | 3 |  | 3 |
| 41 | 12.0 | 2 |  | 2 |  |
| 42 | 12.0 |  | 3 |  | 2 |
| 43 | 12.0 | 2 |  | 3 |  |
| 44 | 12.0 |  | 2 |  | 3 |
| 45 | 9.6 | 2 |  | 2 |  |
| 46 | 9.6 |  | 2 |  | 2 |
| 47 | 8.4 | 2 |  | 1.5 |  |
| 48 | 8.4 |  | 2 |  | 1.5 |
| 49 | 10.8 | 1.5 |  | 3 |  |
| 50 | 10.8 |  | 1.5 |  | 3 |
| 51 | 8.4 | 1.5 |  | 2 |  |
| 52 | 8.4 |  | 1.5 |  | 2 |
| 53 | 9.6 | 1 |  | 3 |  |
| 54 | 9.6 |  | 1 |  | 3 |
| 55 | 7.2 | 3 |  |  |  |
| 56 | 7.2 |  |  | 3 |  |
| 57 | 4.8 | 2 |  |  |  |
| 58 | 4.8 |  |  | 2 |  |
| 59 | 3.6 | 1.5 |  |  |  |
| 60 | 3.6 |  |  | 1.5 |  |
| 61 | 2.4 | 1 |  |  |  |
| 62 | 2.4 |  |  | 1 |  |
| 63 | 1.2 | 0.5 |  |  |  |
| 64 | 1.2 |  |  | 0.5 |  |

Meanwhile, PSRC is explained as follows.

When using M-transmitting antennas, the transmitting side configures a signal vector s including M-symbols and transmits the symbols via separate transmitting antennas, respectively as shown in the below equation.

$$s=[s_1, s_2, \ldots, s_M]^T \quad \text{(Equation 8)}$$

The PSRC method transmits each symbol via an independent channel in an environment in which correlation between antennas and correlation between symbols exists. Namely, by paying attention to the antenna array configuration of the transmitting side, each symbol is multiplied by an eigenvector of channel matrix to be transmitted.

Further, higher-order modulation such as 64 Quadrature Amplitude Modulation (QAM), 16 QAM, etc. is used for an antenna having a relatively high eigen value after looking into a size of each eigenvalue through an eigenvalue decomposition of a channel matrix estimated by a receiving side in the MIMO communication system. In addition, low-order modulation such as BPSK (binary phase shift keying), QPSK (quadrature phase shift keying), etc. is used for an antenna having a relatively low eigenvalue.

That is, the same modulation is not used for the symbols transmitted from the respective transmitting antennas. Instead, a channel status is fed back from a terminal to the transmitting side to decide a modulation scheme to be used in each antenna based on the received channel status. Thus, the receiving side includes a same algorithm to recognize the modulation scheme as used in the respective transmitting antennas.

Moreover, symbols are not transmitted at all to antennas of which eigenvalues resulted from the eigenvalue decomposition of the channel matrix are smaller than a specific value, thereby previously preventing the symbol transmitted from the transmitting antenna from bringing about errors to the receiving side. Despite using such a method, the symbol will be allocated to an antenna having a better channel status to use higher-order modulation, whereby the number of bits to be transmitted from the overall transmitting antennas will increase to enhance system throughput.

In addition, the transmitting side previously handles an antenna of no use in symbol transmission so that the symbol is not transmitted from the handled antenna, whereby overall communication quality can be improved. Namely, the receiving side may feed back the respective eigenvectors separated from each other via eigenvalue decomposition to the transmitting side after having estimated the channel matrix, or the receiving side enables to keep a demodulation allocation table previously agreed between the transmitting and receiving sides via comparison of eigenvectors to feed back an index corresponding to the modulation scheme used in each antenna.

A method of forming a beam according to each symbol in the PSRC method can be represented by the below equation.

$$S = w_1 s_1 + w_2 s_2 + \ldots + w_M s_M \quad \text{(Equation 9)}$$

Here, $w_i$ is a weight vector for forming a beam at each symbol, $s_1$ to $s_M$ are data symbols, respectively, and S is a signal vector after forming the beam for each symbol.

As discussed above, for the symbols transmitted from each antenna, a channel status of each antenna is fed back to the transmitting side and then a modulation scheme to be used in each antenna is decided based on the channel status. Hence, $s_1$ to $s_M$ in equation 9 are selected to use different modulation schemes by comparing eigenvalues of a channel matrix, respectively. Namely, higher order modulation is allocated to an antenna halving a relatively high eigenvalue through the eigenvalue decomposition of the channel matrix, whereas lower order modulation is allocated to an antenna having a relatively low eigenvalue.

A method of finding a weight vector to be multiplied by each symbol is explained as follows. First, it is assumed that an MIMO system includes M-transmitting antennas and N-receiving antennas. If a mobile communication channel matrix that signal vectors differently transmitted via the M-transmitting antenna pass is H, the channel matrix H becomes a N*M matrix when the receiving side includes the N-receiving antennas. If a pilot symbol or a separate pilot channel, which is already recognized by the transmitting/receiving side, is transmitted from each of the transmitting antennas, the receiving side can estimate each component of the channel matrix H.

Further, the eigenvalue decomposition is performed on the channel matrix H by the receiving side. Note the channel matrix H can not become a square matrix, because the present invention assumes a system in which the number of antennas in the transmitting side is greater than that in the receiving side. Moreover, it is unable to execute eigenvalue decomposition directly on the channel matrix. Hence, the present invention executes the eigenvalue decomposition in a manner shown in the below equation. Here, $H^H$ is a Hermitian operation for a vector H.

$$(H^H H)E = E\Lambda \quad \text{(Equation 10)}$$

$$E = [\underline{e}_1 \ \ldots \ \underline{e}_m] \text{ and } \Lambda = \begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_m \end{bmatrix}$$

In equation 10, $\Lambda$ denotes eigenvalues of the matrix $H^H H$ and E indicates the eigenvectors. Further, the eigenvectors generally maintain orthogonality from each other. Hence, when intending to transmit symbols all together to fit the number of antennas in the transmitting side, each of the symbols are multiplied by an independent weight vector to transmit a corresponding symbol.

As shown in equation (9), when the transmitting side forms a beam for each of the symbols and transmits a signal, the receiving side performs the following signal processing. Namely, the receiving side is unable to utilize the signal processing of the previously discussed V-BLAST receiving side, because the signal is transmitted by multiplying each of the symbols by the independent weight vector. Hence, each of the symbols is detected by preferentially estimating S by Zero-Forcing or Minimum Mean Square Error (MMSE) techniques and then by multiplying S by a conjugate of the weight vector having been multiplied by each of the symbols in the transmitting side. Zero Forcing or MMSE can be summarized by the following equations.

First, if a signal is transmitted from a transmitting side by multiplying each symbol by a weight vector, the receiving side receives the signal shown in equation (11).

$$R = HS + n \quad \text{(Equation 11)}$$

In Equation 11, n is an additive white Gaussian noise (AWGN).

If a signal vector estimating the signal vector S transmitted by multiplying each symbol by a weight vector using Zero-Forcing is denoted by $\hat{s}$ that is expressed by the below equation 12.

$$\hat{s} = [H^H H]^{-1} H^H R \quad \text{(Equation 12)}$$

Meanwhile, a signal vector $\hat{s}$ by multiplying each symbol by a weight vector using MMSE can be represented by the below equation (13).

$$\hat{s} = [\alpha I + H^H H]^{-1} H^H R \quad \text{(Equation 13)}$$

In Equation 13, $\alpha$ is a signal to interference noise ratio and I is an identity matrix.

Thus, after the signal vector $\hat{s}$ transmitted by multiplying each symbol by the weight vector using Zero-Forcing or MMSE is estimated, the estimated signal vector $\hat{s}$ is multiplied again by a conjugate of the weight vector transmitted by being multiplied by each symbol in the transmitting side so that estimated values $\hat{s}_1$ to $\hat{s}_M$ of the symbols $s_1$ to $s_M$ transmitted from the transmitting side can be estimated according to the following equation 14.

$$\hat{s}_1 = \underline{w}_1^H \hat{s} \ \ldots \ \hat{s}_M = \underline{w}_M^H \hat{s} \quad \text{(Equation 14)}$$

Then, the estimated $\hat{s}_1$ to $\hat{s}_M$ are demodulated to fit the used modulation so that the bits prior to being allocated to the respective symbols are found. After the bits of the symbols transmitted from the respective antennas have been found, the bit stream transmitted from the transmitting side is determined via multiplexing.

In transmitting different symbols from the antennas, respectively, the symbols are multiplied by eigenvectors of the channel matrix estimated by the transmitting side to transmit, respectively. Besides, by comparing the eigenvalues of the channel matrix resulting from the eigenvalue decomposition to each other relatively to consider channel statuses of the respective antennas, the channel coding and modulation schemes of the symbols to be transmitted from the respective antennas are selected in the receiving side.

In addition, to determine the weight vector that will be multiplied by a symbol to be independently transmitted from each transmitting antenna, eigenvalue decomposition of the channel matrix estimated by the receiving side. Further, eigenvalues and eigenvectors can be found together through the eigenvalue decomposition. Hence, additional calculation is unnecessary. Namely, the modulation scheme that will be used in each antenna is decided to fit the channel status of each antenna not by using the same modulation for the symbols transmitted from the respective transmitting antennas but by receiving channels statuses of the respective antennas through feedback.

Hence, the symbols $s_1$ to $s_M$ in Equation (2) are made to use separate modulation schemes via the comparison of eigenvalues of the channel matrix, respectively. Namely, through the eigenvalue decomposition of the channel matrix, higher order modulation is allocated to an antenna having a relatively high eigenvalue and lower order modulation is allocated to an antenna having a relatively low eigenvalue.

In this instance, a method of deciding the MSC to be allocated to each antenna can be explained as follows.

First, a relative ratio of each eigenvalue is preferentially decided to determine a modulation scheme to be allocated to each antenna with the eigenvalues determined through eigenvalue decomposition such as shown in equation (10).

If the smallest eigenvalue is equal to or smaller than a specific threshold through the relative ratios, the symbols are made not to be transmitted from the corresponding antenna. In addition, the lowest modulation and coding set is used for the minimum eigenvalue except the excluded eigenvalue. Meanwhile, the higher order modulation and coding set is used for an antenna having the highest eigenvalue.

Further, for the middle values, the modulation and coding set of a middle step is used through the comparison of the relative values. Instead, by preparing such a necessary reference as Table 2 previously after confirming various channel statuses through a simulation test, it may be able to select to utilize the corresponding modulation and coding set to fit the channel status with the prepared reference.

Otherwise, because the available modulation and coding are limited to their kind, a set of the available modulation and coding is prepared such as in Table 1. Hence, the MCS to be used in each antenna can be informed via an index because both of the transmitting and receiving sides already know the same reference. Instead, considering that the eigenvalues of the channel matrix vary relatively slow, the entire eigenvalues can return slowly. In such a case, with the returning eigenvalue, the modulation and coding to be used in each antenna should be decided in the transmitting side.

An MIMO system including M-transmitting antennas and N-receiving antennas uses a method based on transmission of M-streams. If the number of transmitting antennas is 'M', the number of transmittable channels is 'M'. Yet, it does not frequently happen that the overall channels are in good situation each moment. Hence, the present invention is based on the P-streams (P<M) transmission.

That is, the data streams of which number is less than 'P' are transmitted using P-channels only. Signals needed to control the corresponding transmission are independent P-control signals and index information of channels selected from the M-channels. Hence, the method according to the present invention only uses P-control signals and indexes of the channels selected from the M-channels, whereas the other methods require independent M-control signals.

One example of the present invention applied to the PSRC method is shown in the following equation.

$$S = w_1 s_1 + w_2 s_2 + \ldots + w_P s_P \quad \text{(Equation 15)}$$

In equation (15), $w_P$ is a Pth one in an eigenvalue size order corresponding to an eigenvector of channel matrix. Namely, eigenvectors having the corresponding eigenvalues after the Pth one in the size order are excluded.

Thus, in the MIMO system using the PARC method of varying the modulation and code set (MSC) for each stream, the present invention restricts the transmission stream number to be equal to or smaller than the valid stream number, thereby advantageously reducing the complicated control signals.

Further, in the system using the PSRC method, the present invention prevents the channel having a low eigen value from being used, thereby considerably reducing throughput loss. In addition, the system reduces a transmission amount of weight vectors transmitted to the transmitting side, thereby decreasing a feedback delay or a quantization error. Moreover, the number of transport streams is lowered to 'P' from 'M', whereby the number of receiving antennas of a terminal receiving the transport streams can be reduced to 'P'. Assuming that the number of transmitting/receiving antennas is (4,4), an amount of control signals is reduced to half as well as the number of receiving antennas is reduced to '2' if a pair of streams are only transmitted only.

Figure 5:
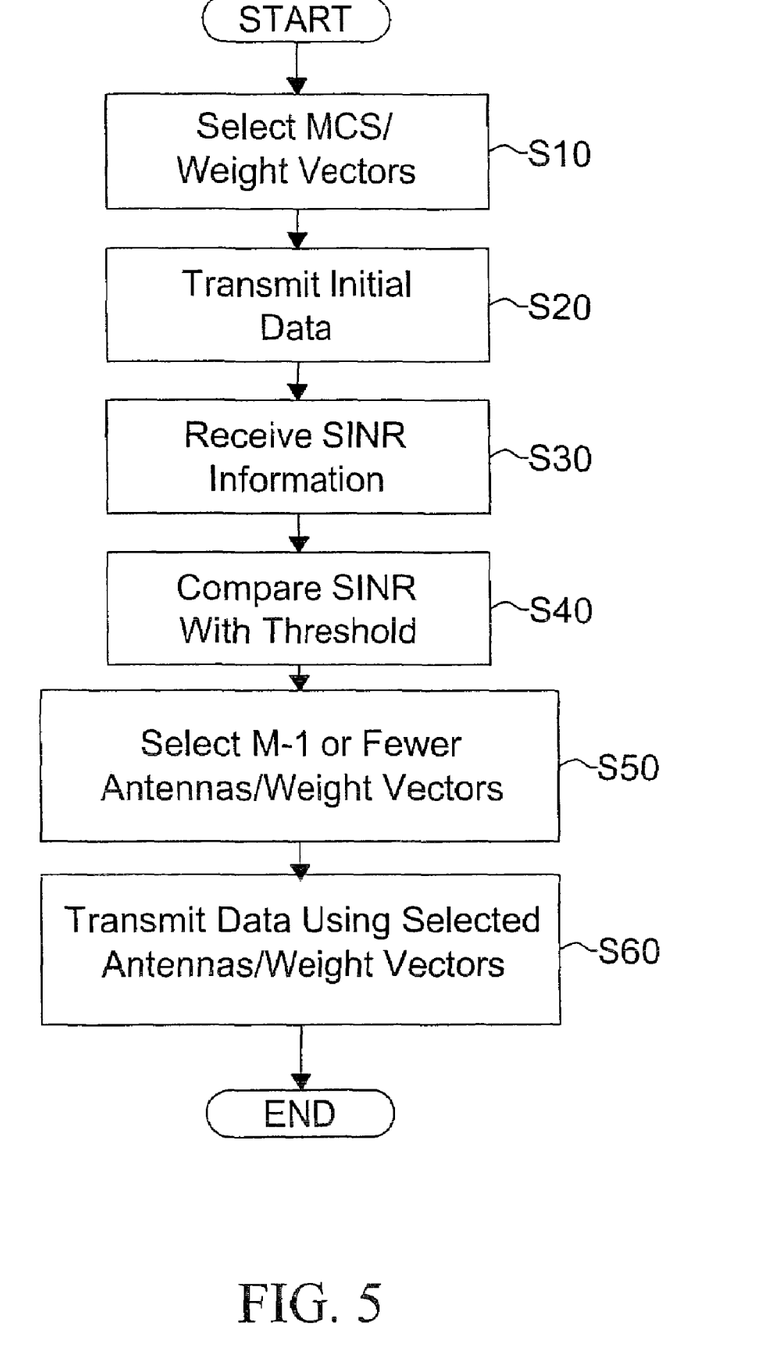
FIG. 5 is a flowchart illustrating a method for controlling signal transmission in the MIMO communication system according to the present invention.

Thus, in summary and as shown in FIG. 5, the method for controlling signal transmission in a MIMO system according to the present invention includes selecting a MCS (for the PSRC method) and weight (eigen) vectors (for the PSRC method) for data stream(s) to be transmitted by M transmitting antennas (step S10). The initial data is then transmitted using the selected MCS/weight vectors (step S20), and channel quality information (e.g., SINR) is received from the receiving end (step S30). Then, the received SINR information may be compared with a threshold (or be compared against each other) in step S40, and a selective M−1 or fewer transmission on antennas/weight vectors are selected (step S50) via the control unit 18 in FIGS. 1 and 3. Further, data is then transmitted using the selected antennas/weight vectors (step S60). Thus, the amount of control signaling etc. is advantageously reduced.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software are. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of controlling a signal transmission in a Multiple Input Multiple Output (MIMO) communication system, comprising:

P transmitting antennas from M transmitting antennas by comparing a channel quality based on channel quality information with a specific threshold, wherein a transmitting antenna corresponding to the channel quality of which is smaller than the specific threshold is excluded in a transmission, and P is a natural number less than M;

determining a modulation and coding set to be allocated to each of the P transmitting antennas;

first demultiplexing a data stream into first P sub-streams corresponding to the P transmitting antennas;

coding and mapping the first P sub-streams to form P sets of symbols by using the modulation and coding set determined per each antenna;

second demultiplexing the P sets of symbols per each sub-stream;

spreading the P sets of demultiplexed symbols using spreading codes which are individually determined per each sub-stream;

combining the demultiplexed spread symbols per each sub-stream to form second P sub-streams;

scrambling the second P sub-streams with scrambling codes; and transmitting the scrambled second P sub-streams at the transmitting end via the P transmitting antennas.

2. The method of claim 1, further comprising:
receiving the channel quality information from a receiving end of the MIMO system, wherein the channel quality information comprises a Signal to Interference Noise Ratio (SINR).

3. The method of claim 1, wherein channel quality information for the not selected transmitting antennas from the M transmitting antennas is not received such that a total amount of received channel quality information is reduced after said selecting.

4. The method of claim 1, wherein the modulation and coding set is selected according to a Per Antenna Rate Control (PARC) transmission method.

5. An apparatus for controlling a signal transmission in a Multiple Input Multiple Output (MIMO) communication system, comprising:
a transmitting antenna configured to transmit a data stream; and
a controller configured to:
select P transmitting antennas from M transmitting antennas by comparing a channel quality based on channel quality information with a specific threshold, wherein a transmitting antenna corresponding to the channel quality of which is smaller than the specific threshold is excluded in a transmission, and P is a natural number less than M,
determine a modulation and coding set to be allocated to each of the P transmitting antennas,
control first demultiplexing of the data stream into first P sub-streams corresponding to the P transmitting antennas,
control coding and mapping the first P sub-streams to form P sets of symbols by using the modulation and coding set determined per each antenna,
control second demultiplexing of the P sets of symbols per each sub-stream,
control spreading the P sets of demultiplexed symbols using spreading codes which are individually determined per each sub-stream,
control combining the demultiplexed spread symbols per each sub-stream to form second P sub-streams,
control scrambling the second P sub-streams with scrambling codes, and
control transmitting the scrambled second P sub-streams at the transmitting end via the P transmitting antennas.

6. The apparatus of claim 5, wherein the controller is to control receiving the channel quality information, and wherein the channel quality information comprises a Signal to Interference Noise Ratio (SINR).

7. The apparatus of claim 5, wherein the modulation and coding set is selected according to a Per Antenna Rate Control (PARC) transmission method.

\* \* \* \* \*